May 15, 1923.
J. C. MANOCK
1,455,118
AUXILIARY TIRE CARRIER
Filed Sept. 15, 1921
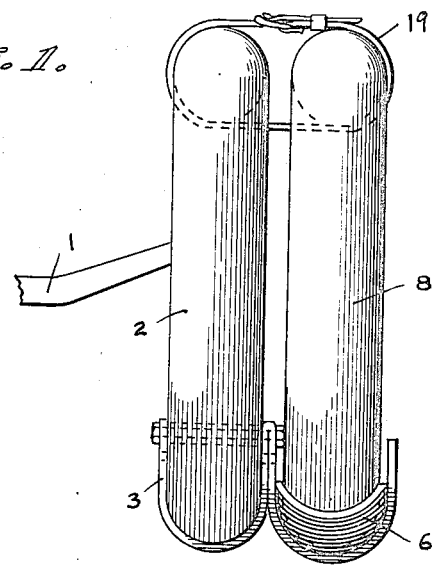
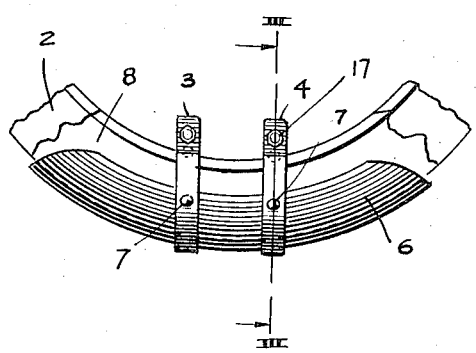
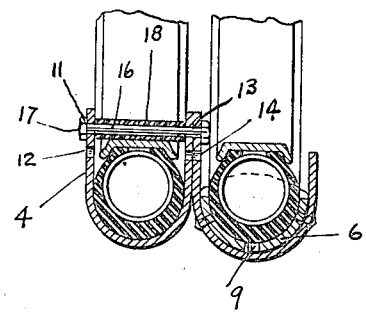
INVENTOR.
JULIUS C. MANOCK
BY
Bradley L. Benson
ATTORNEY Patented May 15, 1923.

1,455,118

UNITED STATES PATENT OFFICE.

JULIUS C. MANOCK, OF ANGIOLA, CALIFORNIA.

AUXILIARY-TIRE CARRIER.

Application filed September 15, 1921. Serial No. 500,893.

*To all whom it may concern:*

Be it known that JULIUS C. MANOCK, a citizen of the United States of America, residing at Angiola, in the county of Tulare and State of California, has invented certain new and useful Improvements in Auxiliary-Tire Carriers, of which the following is a specification.

The present invention is an auxiliary tire carrier for carrying an extra or spare tire on automobiles provided with means for carrying one extra tire.

The objects of the invention are:

(1) To provide a small compact device of neat appearance which may be readily secured to an extra tire or wheel carried on an automobile and which will afford, when so attached, a means of carrying another extra tire.

(2) To increase the carrying capacity of a tire carrier without materially increasing the weight on the car.

(3) To provide an auxiliary tire carrier which may be readily attached to and removed from a wheel or tire carried on a car, and which when removed can be stored or carried in a relatively small space.

(4) To provide an attachment for increasing the tire carrying capacity of a car which will carry an additional tire without the necessity of bolting or otherwise altering the car.

In this specification and the annexed drawings, the invention is illustrated in the form considered to be the best, but it is to be understood that the invention is not limited to such form, because it may be embodied in other forms, and it is also to be understood that in and by the claim following the description it is desired to cover the invention in whatever form it may be embodied.

In the accompanying one sheet of drawings, Fig. 1 is a vertical edge view of an automobile tire suspended on a carrier and showing my auxiliary carrier in end view thereon, supporting an additional tire.

Fig. 2 is rear elevation of my carrier showing a segment of tire supported thereon.

Fig. 3 is a vertical section on the line III—III of Fig. 2.

Referring to the drawings, the numeral 1 indicates a supporting arm attached to an automobile body (not shown) for the purpose of supporting an extra tire 2. At 3 and 4 I show metal bands bent in the form of a double U. One half of these bands serve to carry a tire receptacle 6, which is riveted as shown at 7 to said bands.

The receptacle 6 is arcuate in side elevation and in cross section to conform to the tire 8 which it carries.

The receptacle 6 is provided with a drainage opening 9.

One half of each of the members 3 and 4 serves to engage the tire 2 and the rim therein.

Bolt openings 11 and 12 afford an adjustment for different sizes and types of rims.

The central folded portions of the members 3 and 4 are provided with openings 13 and 14, which register with openings 11 and 12 to accommodate bolts 16 which carry nuts 17. To prevent injury to the parts and prevent rattling, I prefer to use a rubber bushing 18 on the bolts.

The operation of my invention is as follows: The auxiliary carrier is connected to a tire and rim or to a wheel (as the case may be) which is already supported on a car, as shown in Fig. 1. The device is secured by the bolts 16. An additional tire is rested in the receptacle 6 at the bottom and secured as by a strap 19 to the tire 2 at the top.

Wherever I use the word tire in this specification and claim, I wish to be understood as meaning tire, or tire and rim, or complete wheel, &c.

Having thus set forth my invention what I claim and desire to secure by Letters Patent of the United States, is;—

An auxiliary tire carrying attachment, comprising, a U-band and a bolt adapted to embrace and be secured to an auxiliary tire supported and carried by an automobile, a second U-band secured to one limb of said first named band, and of a size to embrace a second tire, and a tire supporting chair secured to and supported by said second U-band.

In testimony whereof I affix my signature.

JULIUS C. MANOCK.